Aug. 10, 1926.
T. OLSEN ET AL
1,595,724
CENTRIFUGAL BALANCING DEVICE
Filed Jan. 13, 1925   3 Sheets-Sheet 1
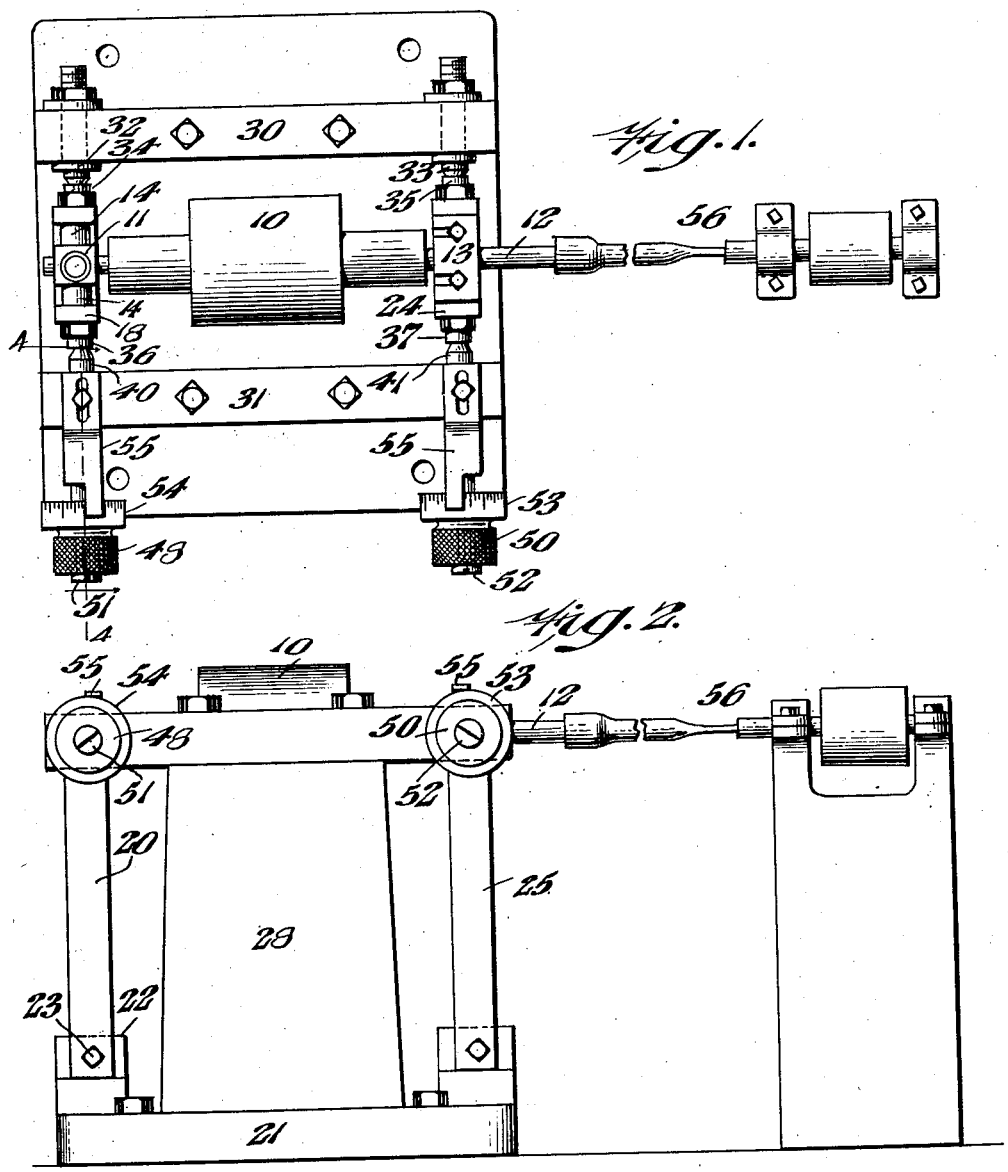
Inventor
Tinius Olsen and
Jacob Lundgren.
By Robert M. Barr.
Attorney Aug. 10, 1926.  1,595,724
T. OLSEN ET AL
CENTRIFUGAL BALANCING DEVICE
Filed Jan. 13, 1925   3 Sheets-Sheet 2
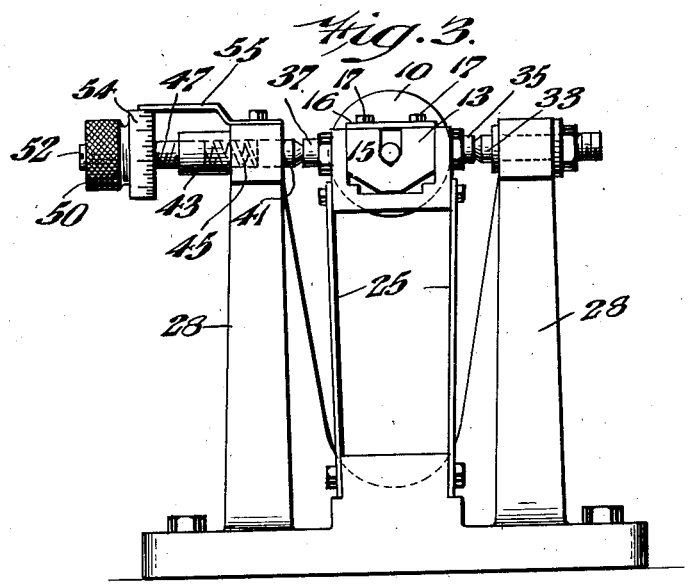
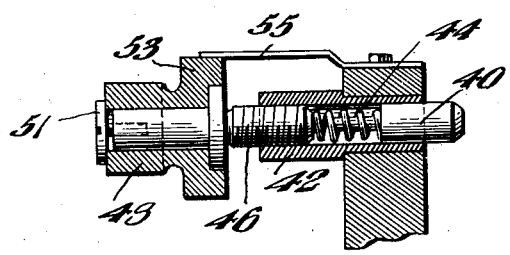
Inventor
Tinius Olsen and
Jacob Lundgren.
By Robert M. Barr.
Attorney

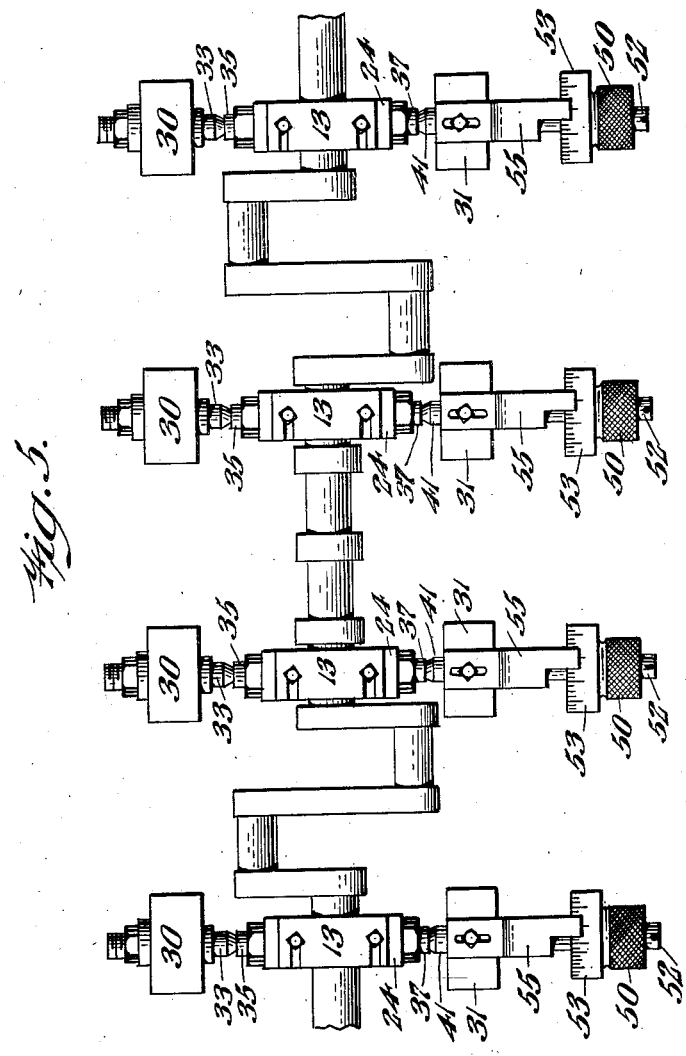

Patented Aug. 10, 1926.

1,595,724

UNITED STATES PATENT OFFICE.

TINIUS OLSEN AND JACOB LUNDGREN, OF PHILADELPHIA, PENNSYLVANIA, ASSIGNORS TO TINIUS OLSEN TESTING MACHINE COMPANY, OF PHILADELPHIA, PENNSYLVANIA, A CORPORATION OF PENNSYLVANIA.

CENTRIFUGAL BALANCING DEVICE.

Application filed January 13, 1925. Serial No. 2,102.

The present invention relates to devices for determining the unbalance of bodies, and more particularly to the correction of dynamic unbalance of such bodies.

Some of the objects of the present invention are to provide an improved means for correcting dynamic unbalance in bodies; to provide means for automatically determining the mass of material causing unbalance in a rotating body; to provide an improved means for measuring and locating excess material causing unbalance in a rotating body; to provide means for determining the lateral pressure on the bearings of a rotating body due to existing centrifugal forces; to provide means whereby the axis of rotation of a body becomes a permanent axis; and to provide other improvements as will hereinafter appear.

In the accompanying drawings, Fig. 1 represents a plan of a balancing machine embodying one form of the present invention; Fig. 2 represents a side elevation of the same; Fig. 3 represents an end elevation of the machine; Fig. 4 represents a sectional detail on line 4—4 of Fig. 1; and Fig. 5 represents a plan showing the present invention as applied to balancing a crank shaft.

Referring to the drawings, one form of the present invention is shown supporting a mass of material, in the form of a rotor 10, the condition of dynamic unbalance of which is to be determined in order that correction can be made and the axis of rotation become a permanent axis.

For the purpose of supporting the rotor 10 for rotation, a bearing 11 is provided to receive one end of the rotor shaft 12, and a bearing 13 is provided to receive the other end of the rotor shaft, the said bearings being arranged so that the rotor 10 or other mass under test can be quickly inserted or removed from the bearings. Thus the bearing 11 is swiveled on trunnions 14, and the bearing 13 is formed in two parts 15 and 16, normally connected by studs 17 or other fastening means whereby one part can be readily removed from the other to release the shaft and allow the rotor to be lifted out.

In order that the lateral pressures upon the bearings 11 and 13 caused by the centrifugal forces of a rotating unbalanced body can be determined and measured for correction, the aforesaid bearings are mounted on laterally yielding or floating supports. The support for the bearing 11 consists of a yoke 18, which carries on its two arms the respective trunnions 14 so that the latter are correctly positioned in aligned relation. The yoke 18 is made fast between the upper ends of two spring arms 20, which are supported in substantial vertical position from a base 21 by means of suitable lugs 22 and fastening devices 23. The support for the bearing 13 consists of a yoke 24, arranged to carry the bearing 13, and supported, in a similar manner to that described for the yoke 18, by spring arms 25 vertically upstanding from the base 21 and fixedly held at the lower ends respectively by lugs 26 and fastening devices 27. Thus, the two ends of the rotor shaft are mounted in bearings respectively which are free to move transversely with respect to the axis of rotation of the rotor 10, or other body under test, the aforesaid movement being caused, in dynamically unbalanced bodies, by the tendency to turn the axis of rotation into a new angular position due to the movement of the centrifugal couple with its lateral pressures.

As a means for measuring these lateral pressures as developed by a dynamically unbalanced body for use in correcting the balance of that body so that such lateral pressures are reduced to nothing, the two bearing spring structures 20 and 25 are mounted between two standards 28 formed integral with the base 21, the one forming a support for a back stop bar 30, and the other a support for a front stop bar 31. These bars 30 and 31 are arranged in parallel relation and in the same horizontal plane as the bearings 11 and 13, so that when the floating bearing supports are moved toward the bar 30, the latter becomes an abutment to resist further movement in that direction. The opposite bar 31 forms a fixed part against which the applied force, for shifting the bearings, reacts.

Preferably the bar 30 is provided with two hardened stop pins 32 and 33, located substantially in the horizontal plane passing through the axis of the body being tested, and respectively arranged in alignment with hardened bearing pins 34 and 35. The pin 34 is secured to and projects co-axially from the trunnion 14 on the side towards the stop bar 30, and the pin 35 is secured to and projects laterally from the side of the yoke 24 towards the bar 30. The respective bearing faces of the pins 32 and 33 are preferably plane surfaces, though they may be slightly convexed towards the center in order to form a relative small bearing area for the ends of the pins 34 and 35, which are of substantially the same general end contour as the pins 32 and 33. The opposite sides of the bearings 11 and 13 are likewise provided respectively with bearing pins 36 and 37 projecting laterally toward the bar 31.

Generally considered, the spring supports, yoke and bearing parts form a laterally movable or floating frame which supports the shaft of a rotatable part at one bearing location; and, in this connection, it should be noted that where a rotatable part has several bearings—for example, a shaft for a multiple cylinder engine—there will be a floating frame to support each bearing required for the part.

For the purpose of separately shifting the movable or floating bearing frame under test conditions so that the lateral bearing pressure, caused by unbalanced forces, can be measured and the angular position of the excess weight located, the bar 31 is provided with two thrust pivot pins 40 and 41 mounted for transverse sliding movement relative to the bar 31, the pin 40 being juxtaposed to and co-axially located with respect to the bearing pin 36, and the pin 41 being juxtaposed to and co-axially located with respect to the bearing pin 37. Normally, the pins 40 and 41 are resting in contact with their pins 36 and 37, though without any pressure being transmitted. As here shown, the bar 31 has two housings 42 and 43 fixed thereto, which form guides for the respective pivot pins 40 and 41, and also hold coil springs 44 and 45 respectively, these latter being interposed respectively between feed screws 46 and 47 and the pins 40 and 41. These feed screws 46 and 47 are threaded into the respective housings 42 and 43, and project outwardly therefrom to receive knurled heads 48 and 50, which are adjustably secured thereon respectively by clamp screws 51 and 52. These heads are respectively provided with indicator wheels 53 and 54, which are suitably graduated in terms of pressure to thus give a reading of the actual lateral pressure exerted upon the bearing by the shaft, due to the centrifugal force. In order to establish a zero for the scale on the wheels 53 and 54, each wheel has an indicator plate 55 operatively positioned with respect to it, and fixedly but adjustably mounted upon the bar 31. The indicator wheels 53 and 54 can thus be calibrated or set to zero by loosening their respective clamping screws 51 and 52 and then turning them until the zero graduation is opposite the plate 55 for that wheel. The screws 51 and 52 are then tightened and the device is ready for operation.

In order to rotate the body 10, its supporting shaft 12 is extended to one side, where it is arranged to be connected for driving purposes to a spindle 56 capable of flexing sufficiently to permit the required shifting of the shaft 12 under the movement of the floating frames. The spindle 56 may be driven from any suitable source of power, though the preferred medium is by direct connection to an electric motor.

The operation of the device is as follows: The body to be tested—for example, the rotor 10—is mounted in the bearings 11 and 13, and the power driven spindle 56 connected to cause the part to rotate at a speed determined by the conditions of use. Assuming there is dynamic unbalance in the body, the tendency of the body under rotation is to transmit a lateral pressure upon the bearings due to the centrifugal forces, which is here utilized as a measure of the excess weight causing the unbalanced condition. These pressures are utilized by turning the feed screws 46 and 47 so that the pins 40 and 41 are advanced against the bearing pins 36 and 37, to shift the two spring frames carrying the body 10 towards the abutment bar 31. This movement is continued until the bearing pins 34 and 35 respectively abut the pins 32 and 33, the contact between the pairs of meeting pin faces being infinitesimally light, but sufficient to prevent further movement of the bearing frames toward the bar 30. The movement of the pins 40 and 41 is accomplished through the compression of the coil springs 44 and 45, so that the greater the pressure required to bring the frames to rest position against the fixed abutment, the greater is the compression of the springs. Since the pressures required to compress the springs given amounts are known and the graduations of the indicator wheels are in terms computed from such pressures, the lateral pressures transmitted against the bearings by the shaft can be read direct from the indicator wheels after they have reached a set position. The correct reading is indicated by the plate 55 on the scale of the indicator wheel. By the foregoing construction it will be evident that side sway of the floating frames is prevented in one lateral direction, while in the opposite direction it is counteracted by the coil springs under compression, and from this balanced pressure the weights of the excess material forming parts of the centrifugal couple are determined by the indicating positions of the wheels with respect to the plates 55.

While the determination of the weight of the excess material is essential, it is also necessary that its angular position with respect to the axis of the body be known in order that correction be made at the proper place to give true running balance. This correction can be made, either by drilling or otherwise removing the excess material on the heavy side of the body, or by adding a like weight to the light side of the body. Having determined the unbalancing weights by taking readings from the indicator wheel scales, the body is continued in rotation in the same position, and a pencil or any other marking means is then brought into contact relation with either the test body or its shaft, so that a mark is made due to the centrifugal variation of the body. This mark appears on the heavy side of the body because the body is still held against the contact points and there is enough play in the metal to mark the side causing variation from true running.

In Fig. 5 the device of the present invention is shown as applied to the determination of unbalance in a crank shaft for use with a multi-cylinder engine. In this arrangement each bearing of the shaft is supported upon a laterally movable spring frame of the form shown in Figs. 1, 2 and 3 which extends transversely of the shaft with its ends respectively in abutting relation with respect to back stop bars 30 and front stop bars 31. In the form of the device of Figs. 1 and 2 the bar 30 was common to two of the measuring devices, and the bar 31 was also common to two, but where more than two are employed as in Fig. 5 each stop bar 30 is a rigid independent abutment and the same construction applies to the stop bars 31. This construction makes it easy to assemble the measuring devices upon a crank shaft or other multiple bearing part as the placing of the devices is not limited by any interconnected parts.

While only a single form is shown in which this invention may be embodied, it is to be understood that the invention is not limited to any specific construction, but might be applied to various forms without departing from the spirit of the invention or the scope of the appended claims.

Having thus described our invention, we claim:

1. In a balancing device, the combination of bearings for a shaft carrying a body to be rotated and tested for balance, means for mounting said bearings for free movement in one plane only transverse to said shaft, and means acting at one side only of said shaft for measuring the lateral pressure of said shaft upon said bearings caused by centrifugal forces acting on said shaft.

2. In a balancing device, the combination of bearings for a shaft carrying a body to be rotated and tested for balance, means for mounting said bearings for free movement in one plane only transverse to said shaft, and means including coil compression springs acting at one side only of said shaft for measuring the lateral pressure of said shaft upon said bearings caused by centrifugal forces acting on said shaft.

3. In a balancing device, the combination of bearings for a shaft carrying a body to be rotated and tested for balance, means for mounting said bearings for free movement in one plane only transverse to said shaft, spring means at one side only of said shaft for counteracting the lateral pressure of said shaft upon said bearings caused by centrifugal forces acting on said shaft, and means for indicating the counteracting pressure.

4. In a balancing device, the combination of bearings for a shaft carrying a body to be rotated and tested for balance, means for mounting said bearings for free movement transverse to said shaft, a fixed abutment located at one side of said shaft in the path of said mounting means, means for moving said mounting means into engagement with said abutment, and means for measuring the pressure exerted by said moving means.

5. In a balancing device, the combination of bearings for a shaft carrying a body to be rotated and tested for balance, means for mounting said bearings for free movement transverse to said shaft, a fixed abutment located at one side of said shaft in the path of said mounting means, means including yielding devices for moving said mounting means into engagement with said abutment, and means for indicating the pressure of said yielding devices.

6. In a balancing device, the combination of a support for a shaft carrying a body to be rotated and tested for balance, means mounting said support for free movement in one plane only transverse to said shaft, means operating from one side only of said shaft for counteracting the lateral pressure of said shaft upon said support caused by centrifugal forces acting on said shaft, and means for indicating the counteracting pressure.

7. In a balancing device, the combination of a support for a shaft carrying a body to be rotated and tested for balance, means for mounting said support for movement in one predetermined plane, means operating from one side only of said shaft for shifting said mounting means to counteract any lateral pressure of said shaft upon said support caused by centrifugal forces acting on said shaft, and means for indicating the counteracting pressure.

8. In a balancing device, the combination of a flexible shaft for carrying a body to be rotated and tested for balance, a support for said shaft, means for mounting said support for movement in one predetermined plane, means operating from one side only of said shaft for shifting said mounting means to counteract any lateral pressure of said shaft upon said support caused by centrifugal forces acting on said shaft, and means for indicating the counteracting pressure.

9. In a balancing device, the combination of a flexible shaft for carrying a body to be rotated and tested for balance, a support for said shaft, means for mounting said support for movement in one predetermined plane, and means including a spring element operating from one side only of said shaft for shifting said mounting means to counteract any lateral pressure of said shaft upon said support caused by centrifugal forces acting on said shaft, and means for indicating the counteracting pressure of said spring element.

10. In a balancing device, the combination of a flexible shaft for carrying a body to be rotated and tested for balance, supports for said shaft, means including devices yielding in predetermined directions for respectively mounting said supports, contact abutments fixed at one side of said mounting means for moving said mounting means into contact with said abutments to counteract pressure of said shaft caused by centrifugal forces, and means for measuring the counteracting pressure.

11. In a balancing device, the combination of a flexible shaft for carrying a body to be rotated and tested for balance, supports for said shaft, frames for respectively mounting said supports, spring means for respectively supporting said frames for movement in a predetermined plane, fixed abutments in the path of said frames, means for shifting said frames into contact with said abutments to counter-balance pressure against said frames caused by centrifugal forces on said shaft, and means to measure the respective counteracting pressures.

Signed at Philadelphia, county of Philadelphia, State of Pennsylvania, this eighth day of January, 1925.

TINIUS OLSEN.
JACOB LUNDGREN.